Aug. 11, 1953

G. W. OWEN 2,648,451

TRUCK LOADING DEVICE

Filed Feb. 7, 1951

Inventor
George W. Owen
Dodge and Sons
Attorneys

Aug. 11, 1953 G. W. OWEN 2,648,451
TRUCK LOADING DEVICE
Filed Feb. 7, 1951 2 Sheets-Sheet 2
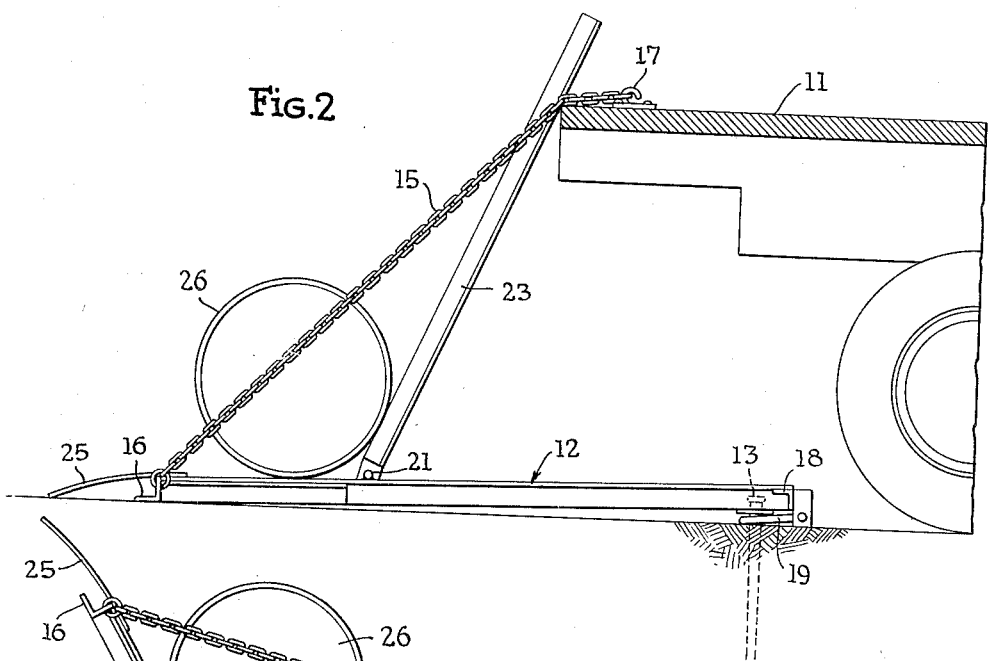
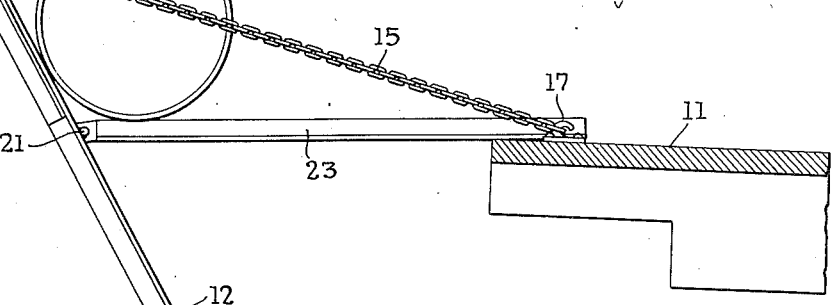
Inventor
George W. Owen
Attorneys

UNITED STATES PATENT OFFICE 2,648,451

TRUCK LOADING DEVICE

George W. Owen, Columbia, S. C.

Application February 7, 1951, Serial No. 209,807

4 Claims. (Cl. 214—354)

This invention relates to that type of loading device which is operated by forward and backward motion of a vehicle to be loaded.

The hinged frame of the truck loading device is secured to the bed of the vehicle by means of flexible tension members. These tension members may take the form of a rope or chain. These members will hereinafter be referred to as cables, the term being used in its broad generic sense to define members of this character.

The cables lead from the outer corners of the vehicle bed to the corresponding outer rear corners of the hinged frame. The frame is so designed that the combined center of gravity of the frame and the load carried thereby is always intermediate the point at which the lifting force is applied and the axis about which it is swung. An anchor is provided, and the frame is swivelled thereto, so that it may be swung in either a vertical or horizontal plane.

The advantages afforded by the outlined construction will be more clearly understood by reference to the drawings and the description thereof.

In the drawings:

Fig. 2 is a side elevation corresponding to Fig. 1.

Fig. 3 is a side elevation showing the invention in its raised or vehicle-loading position, only a portion of the vehicle being shown.

Figures 1, 4:
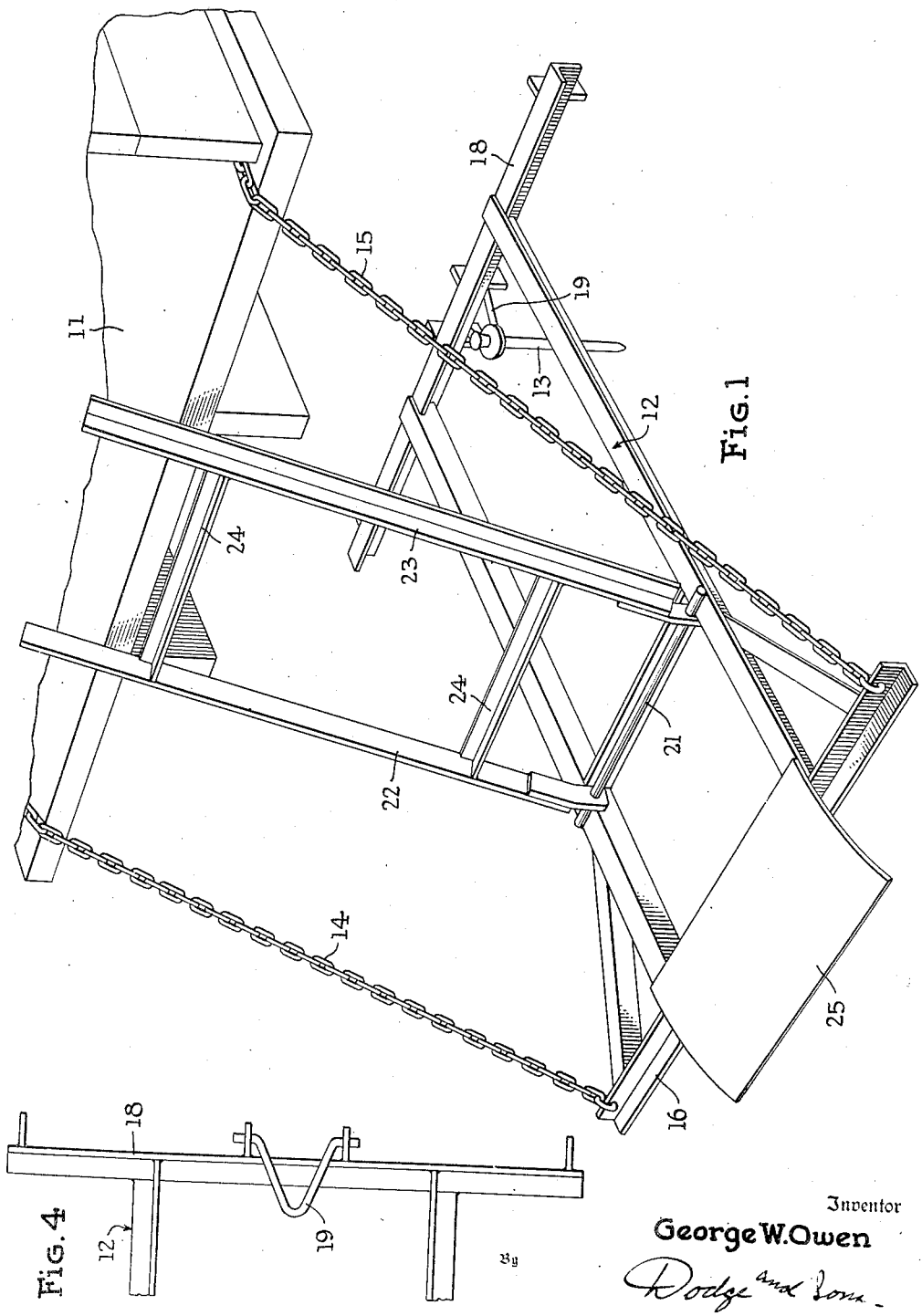
Fig. 1 is a perspective view of a preferred embodiment of the invention, only a portion of the vehicle to which it is attached being shown.
Fig. 4 is a fragmentary bottom view showing the forward transverse member of one part of the frame and the hinge carried thereby.

Referring first to Figs. 1 and 2, the bed of the vehicle to be loaded is indicated by reference numeral 11. Reference numeral 12 denotes generally the swinging load-sustaining frame which is swivelled at its forward edge to an anchor such as the stake 13. Frame 12 is provided at its rear edge with a transverse member 16 which is of a length that approximates the width of the truck bed 11. Cables 14 and 15 extend upward from the outer ends of the transverse member 16 to hook pads 17 which are located near the corresponding outer rear corners of the vehicle bed 11. A transverse member 18 at the forward edge of the frame 12 serves as an axis about which the frame 12 may be swung in a vertical plane. A U-shaped hasp 19 is pivotally connected to the member 18 at its center. The hasp 19 encircles the stake 13 and affords a swivel connection between the anchor and the frame 12 (see Fig. 4).

Intermediate the transverse members 16 and 18 is a hinge pin 21 which is parallel to the members 16 and 18 and secured to the frame 12. Slide rails 22 and 23 are arranged to be swung about the pin 21. The slide rails 22 and 23 are parallel with one another and are joined by transverse members 24. The upper ends of the slide rails 22 and 23 rest on the rear portion of the vehicle bed 11. A ramp 25 is provided whereby the articles to be loaded on the truck may be easily rolled or slid into place on the frame 12.

The loading device in its non-operating position lies flat on the ground. When a vehicle is to be loaded, the slide rails 22 and 23 are raised to an approximately vertical position and the vehicle is backed into place with its longitudinal axis lying approximately above the axis of the stake 13. The longitudinal axis of the frame 12 and the longitudinal axis of the vehicle may be alined by swinging the frame 12 in a horizontal plane about the stake 13.

After these longitudinal axes have been alined, the slide rails 22 and 23 are swung into position against the vehicle bed 11. The cables 14 and 15 are then secured to the hook pads 17. The effective length of these cables may be adjusted so that they are of equal tautness. An article to be loaded, such as a drum, indicated in Figs. 2 and 3 at 26, may be rolled into place on the frame 12 and the vehicle moved forward. Forward motion of the vehicle causes the frame 12 to swing about the transverse member 18 as an axis thus raising it to the position shown in Fig. 3. With the frame in the position shown in this figure, it is a relatively simple matter to roll or slide the article to be loaded forward along the slide rails 22 and 23 and onto the vehicle bed 11. The frame is returned to its initial position by backing the vehicle.

The loading device constructed as above described and as illustrated in the drawings is very flexible in the manner in which it may be used. The swivel connection between the stake 13 and the frame 12 permits the frame to be swung in a horizontal plane so that it may be alined with a vehicle which approaches radially of the stake 13. Also it is not necessary that the longitudinal axes of the frame and the vehicle lie in the same vertical plane. It is possible by adjusting the lengths of the cables 14 and 15 to correct for slight misalinement between these axes without danger of racking the frame, such as would occur if the connection between the frame and the vehicle were rigid.

It will be noticed that the members 16 and 18 are wider than the main portion of frame 12.

The added length of these members lends increased stability to the device when it is being swung in a vertical plane. Designing the frame so that the combined center of gravity of the frame and any load that may be carried by it is always intermediate of the point of application of the force which causes the frame 12 to swing in a vertical plane and the axis about which it swings, eliminates the creation of any upward component of force at this axis. This is an important consideration because it permits the use of a somewhat simpler anchoring means for the front end of the frame than would be possible if this force component existed.

Another important advantage afforded by the described construction is that the backward motion of the vehicle need not be closely controlled during the lowering of the frame as no damage can be done to the frame if the vehicle is backed too far. It is obvious that if the connection between the vehicle bed 11 and the frame 12 were rigid, there would be a likelihood that considerable damage could be done by careless operation of the vehicle.

Although the preferred construction has been described in considerable detail, it will be apparent to anyone skilled in the art that various forms of the device could be designed which would afford the advantages outlined above. No limitation to the precise form illustrated is intended except as specifically set forth in the appended claims.

I claim:

1. A vehicle loading device comprising in combination with said vehicle a frame; an anchor to which said frame is swivelled so that it may be swung in a horizontal plane whereby the longitudinal axes of said frame and said vehicle may be alined and in a vertical plane between a lower position and an upper position; a cable, of adjustable effective length leading from each of the rear corners of said frame to the corresponding rear corner of said vehicle, said cables serving to raise and lower said frame as said vehicle is respectively moved forward or backward; and substantially parallel slide-rails one end of each of which is pivotally secured to respective sides of said frame, said slide-rails bearing on the bed of said vehicle through at least a portion of their length.

2. A vehicle loading device comprising in combination with said vehicle a load sustaining frame; an anchor; swivel connecting means interposed between the forward edge of said frame and said anchor, said frame having at its rear edge a transverse member of a length approximating the width of the bed of said vehicle; cable means extending from each of the rear corners of said bed to corresponding outer ends of said member; and two slide rails each pivotally connected at one end to the sides of said frame and extending between said frame and said bed.

3. A vehicle loading device comprising in combination with said vehicle a load sustaining frame, said frame having at its forward edge a transverse member of a length approximating the width of the bed of said vehicle; an anchor; swivel connecting means interposed between the center of said transverse member and said anchor; cable means extending from each of the rear corners of said bed to the corresponding rear corners of said frame; and two slide rails each pivotally connected at one end to the sides of said frame and extending between said frame and said bed.

4. A vehicle loading device comprising in combination with said vehicle a load-sustaining frame; an anchor; swivel connecting means between said anchor and the forward edge of said frame; cables each having one end connected to said frame at a point remote to said forward edge and the other end connected to the vehicle; and spaced slide rails each having one end pivotally connected to said frame at a point intermediate of said forward edge and the points of attachment of said cables to said frame, said slide rails extending between said frame and the bed of said vehicle, the free ends of said rails bearing on said bed.

GEORGE W. OWEN.

References Cited in the file of this patent

UNITED STATES PATENTS

| Number | Name | Date |
| --- | --- | --- |
| 587,082 | Shanks et al. | July 27, 1897 |
| 656,074 | Wood | Aug. 14, 1900 |
| 1,341,904 | Hubbard | June 1, 1920 |
| 1,770,640 | Beasley | July 15, 1930 |
| 2,056,476 | McDermott | Oct. 6, 1936 |
| 2,116,728 | McDermott | May 10, 1938 |
| 2,589,654 | Archer | Mar. 18, 1952 |

FOREIGN PATENTS

| Number | Country | Date |
| --- | --- | --- |
| 563,859 | France | Oct. 5, 1923 |
| 28,662 | France | Dec. 15, 1924 |
| | (Addition to No. 550,418) | |
| 24,988/30 | Australia | Feb. 5, 1930 |